Patented Oct. 8, 1940

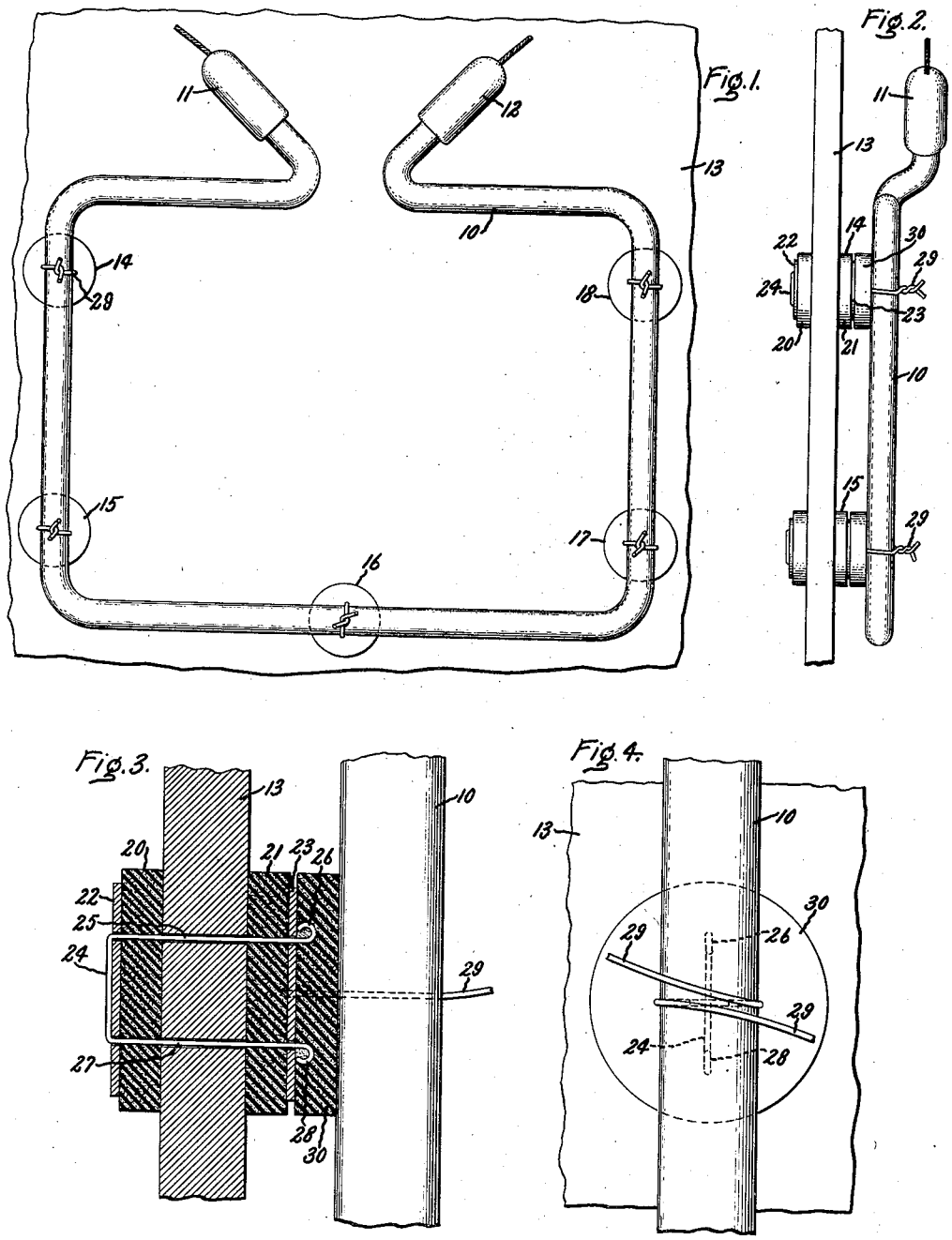

2,217,484

UNITED STATES PATENT OFFICE 2,217,484

SUPPORT FOR TUBULAR LAMPS

Ordean Kiltie, Fort Wayne, Ind., assignor to General Electric Company, a corporation of New York Application February 23, 1940, Serial No. 320,227

5 Claims. (Cl. 248—50)

My invention relates to supports for tubular lamps such as gaseous electric discharge lamps, and more particularly to resilient supports adapted for mounting such lamps on automotive vehicles.

One object of my invention is to provide a support which will absorb the vibrations set up in an automotive vehicle and support the glass tube of a lamp sufficiently constant to minimize and, substantially, to eliminate breakage.

For a better understanding of my invention, together with other and further objects thereof, reference is had to the following description taken in connection with the accompanying drawing, and its scope will be pointed out in the appended claims.

Automotive vehicle bodies are constructed of relatively thin sheet iron in which vibrations are set up by the operation of the engine, as well as the movement of the vehicle. The vibrations set up by the operation of the engine are of a relatively constant magnitude and of a relatively high frequency, while the vibrations set up by the movement of the vehicle are of an uneven character, both as to magnitude and frequency. Gaseous electric discharge lamps which are made of thin walled glass tubes with various grades of glass are subject to breakage unless these vibrations are absorbed before reaching the glass tubes. These tubes are necessarily supported at widely spaced points for the reason that a continuous support for the glass tube is impractical. These glass tubes cover a relatively large area and the vibrations set up in any surface of such area may produce bends in the glass tubing, and thereby breakage.

In accordance with my invention, I provide a support having, in effect, two resilient links therein, the resiliency of these links having different resistances to vibration, and thereby adapted to absorb the above-mentioned vibrations set up in an automotive vehicle.

In the accompanying drawing, Fig. 1 illustrates a front elevation of a gaseous electric discharge tube mounted upon a section of a vehicle wall by means of supports made in accordance with my invention; Fig. 2 is an end view of the lamp shown in Fig. 1; Fig. 3 is a cross-sectional view of a support built in accordance with my invention; and Fig. 4 is a plan view thereof.

Referring to the drawing in detail, Fig. 1 illustrates a lamp 10 provided with terminals 11 and 12 mounted upon a section of a vehicle wall 13 by means of resilient supports 14, 15, 16, 17, and 18. Fig. 2 is an end view of this lamp illustrating the thickness of the wall 13 and the elements of the support illustrated in greater detail in Figs. 3 and 4.

Fig. 3, as above stated, illustrates a cross-sectional view of a resilient support, such as illustrated in Figs. 1 and 2, taken along the axis of the tubular lamp supported thereby. The support consists of resilient washers or pads 20 and 21, preferably round and preferably made of sponge rubber. These washers are placed or cemented on opposite sides of the wall 13. A washer, or plate, 22 is placed concentrically with the washer 20 upon its outer surface, and a washer, or plate, 23 is placed concentric with and on the outer surface of the washer 21. The washers 22 and 23 may be of metal, fibre, or other suitable rigid material, or they may be made of semi-rigid material if exceptional resiliency is required in the support. The washers 20 to 23 are tied together by a suitable thread or wire and preferably by means of a wire clip 24. This wire clip 24 is U-shaped and of a relatively stiff wire having one arm 25 projecting through suitable holes in the washers 20 to 23 and in the wall 13. The end 26 of this one arm 25 is bent into a loop to engage the surface of washer 23 and to prevent the washer slipping off the end of this arm. The second arm 27 of this clip projects through another set of aligned holes in the washers 20 to 23 and through a hole in the wall 13. This arm is also bent into a loop at its end 28 to engage the surface of washer 23 and thereby prevent the washer 23 slipping off the end of this arm. The loops 26 and 28 are easily formed by properly shaped pliers. The wire used for this purpose being relatively stiff, the loops 26 and 28 retain their shape against the resiliency of the rubber. The loops are further used to place rubber pads 20 and 21 under compression. By merely increasing the turns in the loops, the wire is shortened and the rubber pads are placed under a compression corresponding to the extent of these turns. The holes 25 and 27 in the wall 13 are sufficiently large to permit a free movement of the clip arms in response to vibrations set up in the wall 13, so that the two rigid washers 22 and 23, being connected by the metallic clip 24, may move as a unit relatively to the wall. The compression of these washers may be adjusted or tuned to absorb the high frequency vibrations transmitted through the wall 13. The tubing of the lamp 10 is attached to the support built of the washers 20 to 23 by means of a wire 29 or other flexible thread. This wire or thread is threaded through two holes in the washer 23, these holes being placed intermediate the holes for the clips 24. Another resilient pad 30 made preferably of sponge rubber is placed between the tubing 10 and the washer 23. The wire 29 extends through the pad 30 on opposite sides of the tube and is twisted about the tubing of the lamp to anchor the tubing to the support. The pressure with which the tube is tied or anchored to the pad 30 places this pad under less compression than the compression under which the pads 20 and 21 are placed.

In operation, the above-described support absorbs the relatively high order of frequencies and substantially constant magnitude vibrations of the wall 13 set up by the vibration of the engine in the automotive vehicle. The pads 20 and 21 are for this purpose placed under a compression which is adjusted by the loops on the end of the wire clip arms 25 and 27. Additional resiliency is obtained through the pad 30 between the rigid washer and the lamp tubing; this pad absorbing the vibrations of a higher magnitude and of a record order of frequencies set up by the motion of the vehicle. This latter pad 30 is placed under a relatively lower compression by the wire 29. This combination of resilient and relatively rigid elements has proved in practice to be of great advantage in supporting glass tubing and has substantially eliminated breakage of the tubes caused by such vibrations.

What I claim as new and desire to secure by Letters Patent of the United States is:

1. In a gaseous discharge lamp mounting, the combination of resilient pads arranged on opposite sides of a supporting wall, rigid plates mounted on the surface of said pads, a binding thread projecting through said plates and said supporting wall for connecting said plates to each other, said thread being movable freely through said wall to allow movement of said two connected plates relatively to said wall, a third resilient pad mounted on the outer surface of one of said plates, a binding thread looped through said last-mentioned plate projecting through said last-mentioned pad and arranged to fasten a tubular lamp to the outer surface of said last-mentioned pad.

2. In a gaseous discharge lamp mounting, the combination of a resilient pad mounted upon each of two opposite sides of a supporting wall, a rigid disk upon the outer surface of each of said resilient pads, a wire connecting said disks projecting through said supporting wall and freely movable through said wall, said wire being adjustable to place said resilient pads under a desired compression, a resilient pad on the other side of one of said disks, a wire anchored in said last-mentioned disk projecting through said last-mentioned resilient pad and arranged to bind a gaseous discharge lamp to the surface of said last-mentioned pad.

3. In a tubular lamp mounting, the combination of soft rubber pads arranged on opposite sides of a supporting wall, metal plates on said pads, a binding wire extending freely through said wall and arranged to bind said metal plates to each other, the ends of said wire being looped and adjusted to place said rubber pads under a desired compression, a rubber pad placed between one of said plates and the lamp, and a binding wire anchored in said plate arranged to extend through said last mentioned pad and bind said lamp to said pad.

4. In a tubular lamp mounting, the combination of resilient pads arranged on opposite sides of a supporting wall, rigid plates mounted on the surface of said pads, a binding thread projecting through said plates and said supporting wall, said thread connecting said plates to each other and placing said pads under a desired compression, said thread being movable freely through said wall to permit movement of said two connected plates relatively to said wall in response to vibrations of an order of frequencies affected by said compresed pads, a third resilient pad mounted on the outer surface of one of said plates, a binding thread looped through said last-mentioned plate and arranged to fasten a tubular lamp to the outer surface of said last-mentioned pad, said binding being arranged to place said last-mentioned pad under compression, this compression being less than the compression of the first-mentioned pads thereby to compensate for vibrations of a second order of frequencies.

5. In a tubular lamp mounting, a combination of soft rubber pads arranged on opposite sides of a supporting wall, metal plates on said pads, a binding wire extending freely through said wall and arranged to bind said metal plates to each other, the ends of said wire being looped and adjusted to place said rubber pads under a desired compression for effectively absorbing vibrations of a predetermined order of frequencies, a rubber pad placed between one of said plates and a tubular lamp, and a binding wire anchored in said last-mentioned plate arranged to extend through said last-mentioned pad and adjusted to bind said tubular lamp to said pad in a manner to place said last-mentioned pad under a compression which is less than the compression placed upon the first-mentioned pads thereby to absorb vibrations of a second order of frequencies.

ORDEAN KILTIE.